(12) United States Patent
Maki et al.

(10) Patent No.: US 7,469,974 B2
(45) Date of Patent: Dec. 30, 2008

(54) VEHICLE BRAKE CONTROL DEVICE

(75) Inventors: Kazuya Maki, Nagoya (JP); Yasuo Takahara, Anjo (JP)

(73) Assignee: Advics Co., Ltd., Aichi-pref. (JP)

( * ) Notice: Subject to any disclaimer, the term of this patent is extended or adjusted under 35 U.S.C. 154(b) by 250 days.

(21) Appl. No.: 11/591,494

(22) Filed: Nov. 2, 2006

(65) Prior Publication Data
US 2007/0114844 A1 May 24, 2007

(30) Foreign Application Priority Data
Nov. 18, 2005 (JP) ............................. 2005-333610

(51) Int. Cl.
*B60T 13/18* (2006.01)
(52) U.S. Cl. ...................... 303/11; 303/113.1
(58) Field of Classification Search ................ 303/10, 303/11, 113.1–113.4, 155
See application file for complete search history.

(56) References Cited

U.S. PATENT DOCUMENTS

| | | | |
|---|---|---|---|
| 6,113,197 A | 9/2000 | Kuroki et al. | |
| 6,234,588 B1 | 5/2001 | Sawada | |
| 6,595,599 B2* | 7/2003 | Soga | 303/113.1 |
| 7,014,277 B2* | 3/2006 | Soga | 303/122 |
| 2004/0206589 A1* | 10/2004 | Kamiya et al. | 188/106 P |
| 2007/0188014 A1* | 8/2007 | Sato et al. | 303/11 |
| 2007/0188015 A1* | 8/2007 | Sato et al. | 303/11 |
| 2007/0188017 A1* | 8/2007 | Niino et al. | 303/113.2 |
| 2007/0205658 A1* | 9/2007 | Sato et al. | 303/10 |
| 2007/0210642 A1* | 9/2007 | Niino et al. | 303/11 |
| 2007/0210648 A1* | 9/2007 | Sato et al. | 303/155 |
| 2008/0048492 A1* | 2/2008 | Sakai | 303/113.1 |

FOREIGN PATENT DOCUMENTS

JP  A-2004-268868  9/2004

* cited by examiner

*Primary Examiner*—Christopher P Schwartz
(74) *Attorney, Agent, or Firm*—Posz Law Group, PLC (57) ABSTRACT

During normal braking, a brake fluid supply route is used through which brake fluid is supplied from a master reservoir to wheel cylinders to using first to fourth pumps. When an abnormality occurs, a route is used through which a master cylinder pressure, which is generated by depressing a brake pedal, is transmitted through brake conduits to the wheel cylinders for both front wheels. First to fourth linear valves are provided in parallel with the first to fourth pumps, respectively, and during normal braking, the first to fourth linear valves are operated under duty control to adjust the wheel cylinder pressures that are generated in the wheel cylinders to, respectively.

12 Claims, 9 Drawing Sheets

|  | NORMAL BRAKING | UBNORMAL BRAKING |
|---|---|---|
| SNO1 | ON (CLOSED) | OFF (OPEN) |
| SNO2 | ON (CLOSED) | OFF (OPEN) |
| SWC1 | ON (OPEN) | OFF (CLOSED) |
| SWC2 | ON (OPEN) | OFF (CLOSED) |
| SLFR | DUTY | OFF (OPEN) |
| SLRL | DUTY | OFF (OPEN) |
| SLFL | DUTY | OFF (OPEN) |
| SLRR | DUTY | OFF (OPEN) |
| SCSS | ON (OPEN) | OFF (CLOSED) |
| FIRST & SECOND MOTOR | ON | OFF |

VEHICLE BRAKE CONTROL DEVICE

CROSS REFERENCE TO RELATED APPLICATION

This application is based on and incorporates herein by reference Japanese patent application No. 2005-333610 filed on Nov. 18, 2005.

FIELD OF THE INVENTION

The present invention relates to a vehicle brake control device which generates, when normal braking can be carried out without any abnormality, a pressure (hereinafter referred to as a W/C pressure) in a wheel cylinder (hereinafter referred to as a W/C) by causing a pump to draw in and discharge brake fluid and generates, when an abnormal situation arises in braking, the W/C pressure mechanically based on operation of a brake operating member by a driver.

BACKGROUND OF THE INVENTION

In Japanese Patent Publication No. H10-203338, a brake-by-wire vehicle brake control device is proposed which has four pumps respectively for the four wheels of a vehicle. Two of the four pumps are located in a common conduit path for two of the four wheels and are driven by a common motor. The other two of the four pumps are located in another common conduit path for the other two of the four wheels and are driven another common motor.

In the vehicle brake control device, a detection signal from a depression force sensor is inputted to a brake ECU when a depression force is applied to a brake pedal, which is an example of a brake operating member. On detecting the depression force, the brake ECU device drives the motors to activate the pumps. The pumps accordingly draw in and discharge brake fluid that is in a tank and generate a wheel cylinder pressure (hereinafter referred to as the "W/C pressure"). The brake ECU controls according to the applied depression force the amount of opening of a variable orifice provided for each of the wheels, thereby adjusting the W/C pressure such that the adjusted W/C pressure becomes appropriate for the detected depression force.

However, in the vehicle brake control device configured as described above, a mechanical connection is completely severed between the depression force on the brake pedal and supply of brake fluid from the tank. Therefore, any fail-safe measure which generates a braking force even if some sort of abnormality occurs in the vehicle brake control device inevitably depends on control performed by the brake ECU. To guarantee reliability of the fail-safe measure, every type of control by the brake ECU must be made more complicated, which is not desirable.

SUMMARY OF THE INVENTION

It is therefore an object of the present invention to provide a vehicle brake control device in which, as a fail-safe measure in an abnormal situation, a wheel cylinder pressure (hereinafter referred to as a W/C pressure) is mechanically generated by an operation of a brake operating member by a driver.

In a vehicle brake control device according to an aspect of the present invention, a relationship between supplying of brake fluid from a cylinder (3) and an input of a depression force on a brake operating member (1) is not mechanically severed. Therefore, even if some sort of abnormality occurs in the vehicle brake control device, a braking force can be generated reliably without depending on control performed by a control portion (100). Thus the vehicle brake control device has a structure that is effectively fail-safe. That is, a vehicle brake control device can be provided such that the wheel cylinder pressure is generated mechanically based on the operation of the brake operating member by the driver, when an abnormal situation arises (that is, when fail-safe operation is carried out.)

BRIEF DESCRIPTION OF THE DRAWINGS

The invention, together with additional objective, features and advantages thereof, will be best understood from the following description, the appended claims and the accompanying drawings. In the drawings:

DETAILED DESCRIPTION OF THE EMBODIMENTS

Embodiments of the present invention will be explained below with reference to the drawings. In the embodiments below, identical reference symbols are used in the drawings to represent identical or equivalent elements.

First Embodiment

The vehicle brake control device according to a first embodiment of the present invention is applied to a vehicle with an X-shaped hydraulic circuit including two conduit paths, one of which serves the right front wheel and the left rear wheel and the other of which serves the left front wheel and the right rear wheel.

Figure 1:
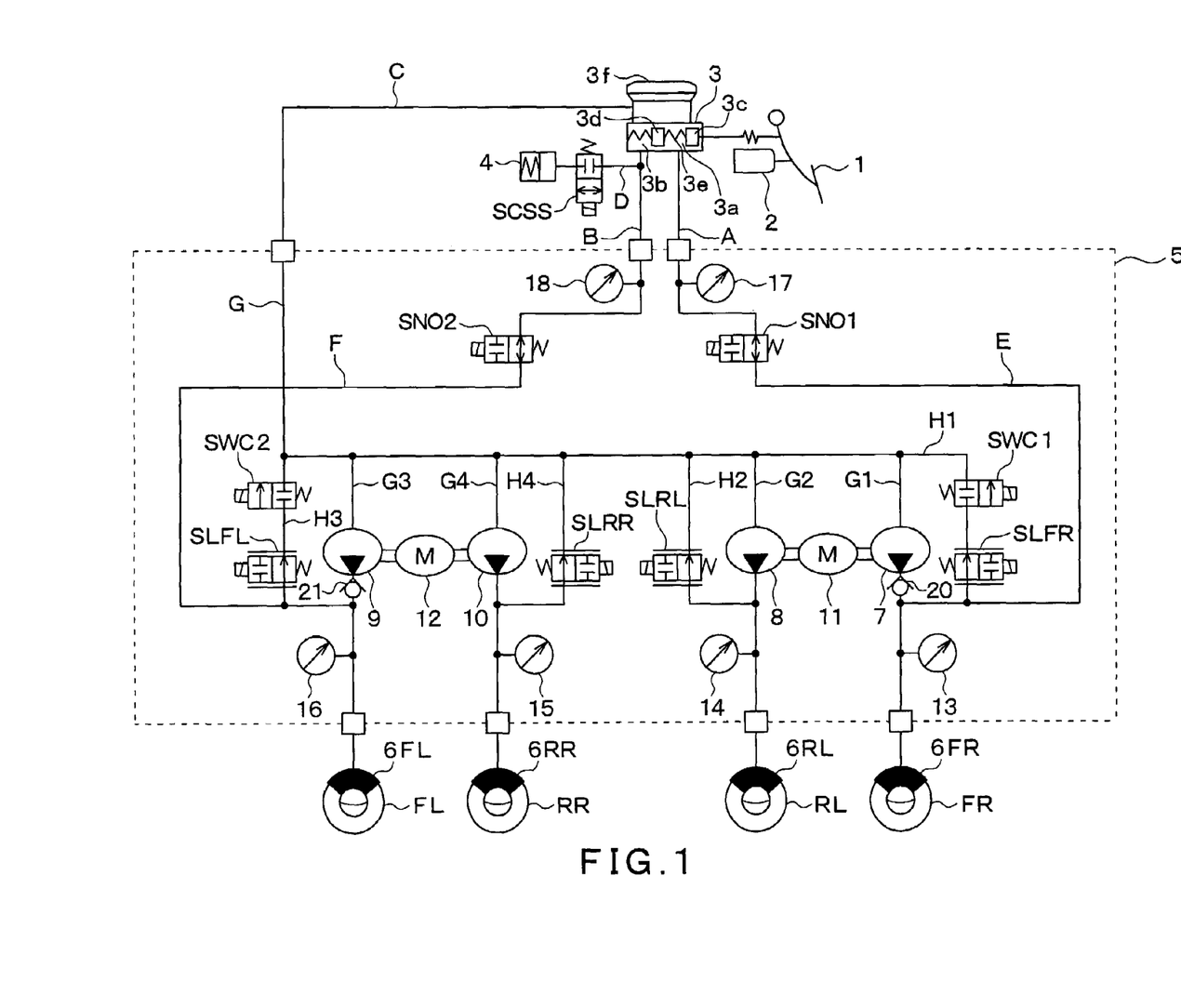
FIG. 1 is a diagram showing a hydraulic circuit configuration of a vehicle brake control device according to a first embodiment of the present invention.

As shown in FIG. 1, the vehicle brake control device includes a brake pedal 1, a depression force sensor 2, a master cylinder (hereinafter referred to as an M/C) 3, a stroke control valve SCSS, a stroke simulator 4, a brake fluid pressure control actuator 5, and wheel cylinders (hereinafter referred to as W/Cs) 6FL, 6FR, 6RL, 6RR, as well as a brake ECU 100 shown in FIG. 2, When the brake pedal 1, which is an example of a brake operating member, is depressed by a driver, the depression force applied to the brake pedal 1 is inputted to the depression force sensor 2, and a detection signal corresponding to the applied depression force is outputted by the depression force sensor 2. The detection signal is inputted to the brake ECU 100, and thus the depression force applied to the brake pedal 1 is detected by the brake ECU 100. Although the depression force sensor 2 is used as an example of an operation amount sensor for detecting an operation amount of the brake operating member, a stroke sensor or the like may also be used as another example of the operation amount sensor. The vehicle brake control device may also be configured such that it detects a state of operation of the brake pedal 1 based on detection signals from a stroke sensor and pressure sensors 17 and 18, which detect an M/C pressure and will be described later.

A push rod or the like is connected with the brake pedal 1 and transmits the applied depression force to the M/C 3. When the push rod or the like is pushed, the M/C pressure is generated in a primary chamber 3a and a secondary chamber 3b, which are provided in the M/C 3.

The M/C 3 includes a primary piston 3c and a secondary piston 3d, which form and demarcates the primary chamber 3a and the secondary chamber 3b. The primary piston 3c and the secondary piston 3d receive an elastic force of a spring 3e, thereby return the brake pedal 1 to its initial position when the brake pedal 1 becomes free from the depression force.

The vehicle brake control device also includes brake conduits A and B, which respectively extend from the primary chamber 3a and the secondary chamber 3b of the M/C 3 to the brake fluid pressure control actuator 5.

The M/C 3 also includes a master reservoir 3f. While the brake pedal 1 is in its initial position, the master reservoir 3f is connected with the primary chamber 3a and the secondary chamber 3b via channels not shown in FIG. 1, supplies brake fluid to the M/C 3, and stores any surplus brake fluid.

A brake conduit C directly extends from the master reservoir 3f to the brake fluid pressure control actuator 5.

The stroke simulator 4 is connected with a brake conduit D, which leads to the brake conduit B, and serves to receive the brake fluid in the secondary chamber 3b. The stroke control valve SCSS, a type of normally-closed two-position valve, is provided in the brake conduit D and controls open and closed states of the brake conduit D. A normally closed two-position valve opens a path to which it is installed while electrical power is supplied to it, and closes the path while electrical power is not supplied to it. The configuration allows the stroke control valve SCSS to control the flow of brake fluid to the stroke simulator 4.

The brake fluid pressure control actuator 5 is configured as described below.

The actuator 5 includes a brake conduit E which is connected with the brake conduit A so that the primary chamber 3a is connected via the brake conduit E With the W/C (first front-wheel W/C) 6FR, which corresponds to a front wheel FR. A first normally-open valve (a first control valve) SNO1 is located in the brake conduit E. The first normally-open valve SNO1 is a two-position valve that opens a path to which it is installed while electrical power is not supplied to it, and closes the path while electrical power is supplied to it. The first normally-open valve SNO1 controls the open and closed states of the brake conduit E.

The actuator 5 also includes a brake conduit F which is connected with the brake conduit B so that the secondary chamber 3b is connected via the brake conduit F with the W/C (second front-wheel W/C) 6FL, which corresponds to a front wheel FL. A second normally-open valve (a second control valve) SNO2 is located in the brake conduit F. The second normally-open valve SNO2 is a two-position valve opens a path to which it is installed while electrical power is not supplied to it, and closes the path while electrical power is supplied to it. The second normally-open valve SNO2 thus controls the open and closed states of the brake conduit F.

The actuator also includes a brake conduit G which is connected with the brake conduit C that extends from the master reservoir 3f. The brake conduit G branches into four brake conduits called brake conduits G1, G2, G3, and G4 and is respectively connected with the W/Cs 6FR, 6RL, 6FL, and 6RR, wherein the W/Cs 6FL and 6FR respectively correspond to the front wheels FL and FR, and the W/Cs (first and second rear-wheel W/Cs) 6RL and 6RR respectively correspond to the rear wheels RL and RR. Note that the brake conduit G includes the brake conduits G1 to G4.

The brake conduits G1 to G4 are respectively provided with pumps (first to fourth pumps) 7, 8, 9, 10. The pumps 7 to 10 are configured as, for example, trochoid pumps which are effective for quietness. The pumps 7 and 8 are driven by a first motor 11, and the pumps 9 and 10 are driven by a second motor 12.

Brake conduits H1, H2, H3, and H4 are located in parallel with the pumps 7 to 10, respectively.

A first normally-closed valve (a third control valve) SWC1 and a first linear valve SLFR are located in series in the brake conduit H1 connected in parallel with the pump 7. The first normally-closed valve SWC1 is located closer than the linear valve SLFR is to the intake side (upstream side) of the pump 7, and the first linear valve SLFR is located closer than the first normally-closed valve SWC1 is to the discharge side (downstream side) of the pump 7. In other words, the first normally-closed valve SWC1 controls the open and closed states of the path between the master reservoir 3f and the first linear valve SLFR.

A second linear valve SLRL is located in the brake conduit H2 connected in parallel with the pump 8.

A second normally-closed valve (a fourth control valve) SWC2 and a third linear valve SLFL are located in series in the brake conduit H3 connected in parallel with the pump 9. The second normally-closed valve SWC2 is located closer than the third linear valve SLFL is to the intake side (upstream side) of the pump 9, and the third linear valve SLFL is located closer than the second normally-closed valve SWC2 is to the discharge side (downstream side) of the pump 9. In other words, the second normally-closed valve SWC2 controls the open and closed states of the path between the master reservoir 3f and the third linear valve SLFL.

A fourth linear valve SLRR is located in the brake conduit H4 connected in parallel with the pump 10.

A first pressure sensor 13, a second pressure sensor 14, a third pressure sensor 16, and a fourth pressure sensor 15 are respectively located in the brake conduits G1 to G4, between the pumps 7 to 10 and the W/Cs 6FR to 6RR, and are configured in such a way that the pressures in each of the W/Cs can be detected. The pressure sensors 17 and 18 are respectively located in the brake conduits E and F on the upstream sides (the M/C 3 sides) of the first and second normally-open valves SNO1, SNO2, and are configured in such a way that an M/C pressure that is generated in the primary chamber 3a and the secondary chamber 3b of the M/C 3 can be detected.

Check valves 20 and 21 are respectively located in the discharge port of the pump 7 which pressurizes the W/C 6FR, and in the discharge port of the pump 9 which pressurizes the W/C 6FL. The check valves 20 and 21 are provided to prevent brake fluid from flowing respectively from the W/Cs 6FR and 6FL to the pumps 7 and 9.

In the vehicle brake control device, a first conduit path includes a hydraulic circuit (a first auxiliary brake conduit) that connects the primary chamber 3a with the W/C 6FR via the brake conduit A and the brake conduit E. The first conduit path also includes a hydraulic circuit (a first main brake conduit) that connects the master reservoir 3f and the W/Cs 6FR and 6RL via the brake conduits C G, G1, and G2. The first conduit path further includes hydraulic circuits (first and second pressure-adjusting brake conduits) having the brake conduits H1 and H2, which are connected in parallel with the pumps 7 and 8, respectively.

Also in the vehicle brake control device, a second conduit path includes a hydraulic circuit (a second auxiliary brake conduit) that connects the secondary chamber 3b and the W/C 6FL via the brake conduit B and the brake conduit F. The second conduit path also includes a hydraulic circuit (a second main brake conduit) that connects the master reservoir 3f and the W/Cs 6FL and 6RR via the brake conduits C, G, G3, and G4. The second conduit path further includes hydraulic circuits (third and fourth pressure-adjusting brake conduits) having the brake conduits H3 and H4, which are connected in parallel with the pumps 9 and 10, respectively.

Figure 2:
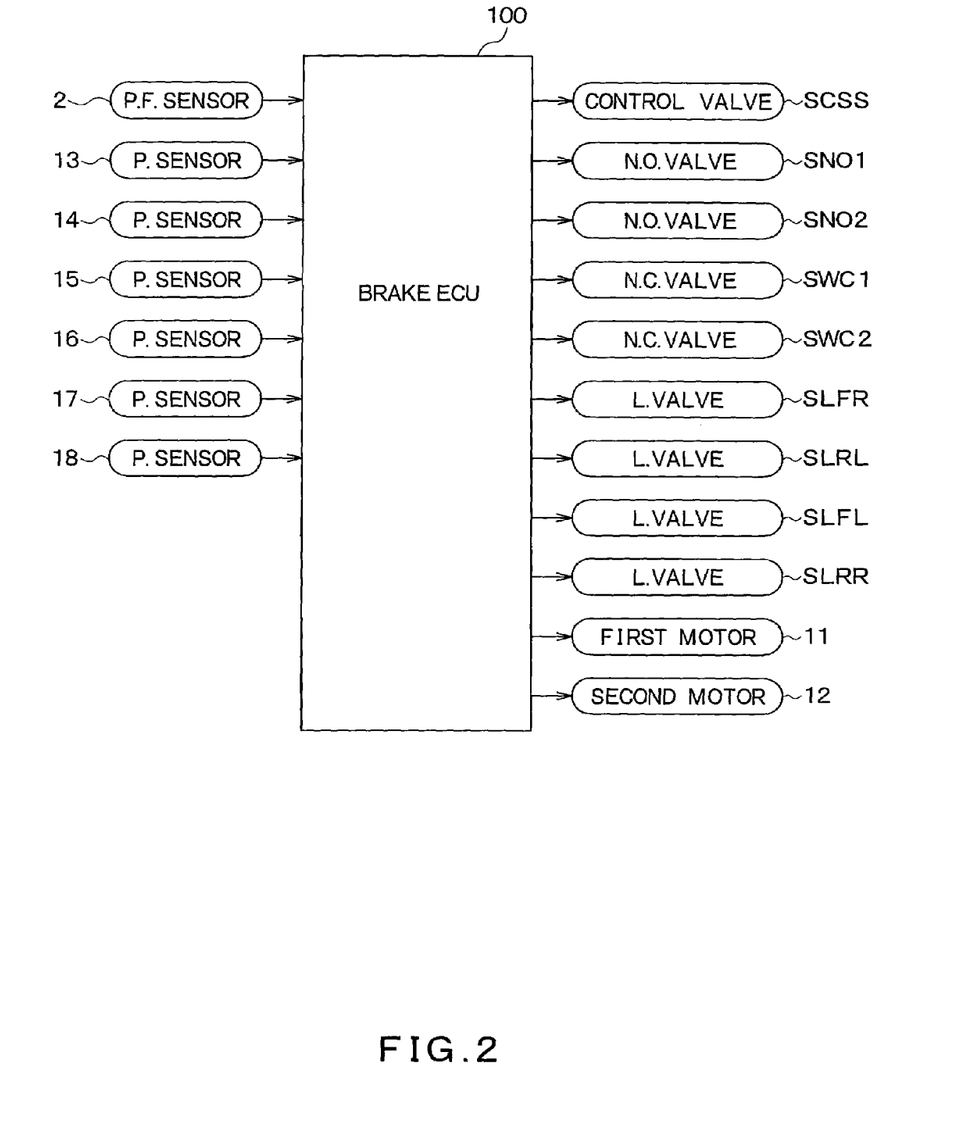
FIG. 2 is a block diagram showing input/output relationships of signals of a brake ECU that controls a control system of the vehicle brake control device shown in FIG. 1.

As shown in FIG. 2, detection signals from the depression force sensor 2 and the pressure sensors 13 to 18 are inputted to the brake ECU 100. Based on the depression force, the W/C pressures, and the M/C pressures that are determined on the basis of the detection signals, the brake ECU 100 outputs control signals to operate the various control valves SCSS, SNO1, SNO2, SWC1, SWC2, SLFR, SLRL, SLFL, SLRR, and the first and second motors 11, 12.

Figure 3:
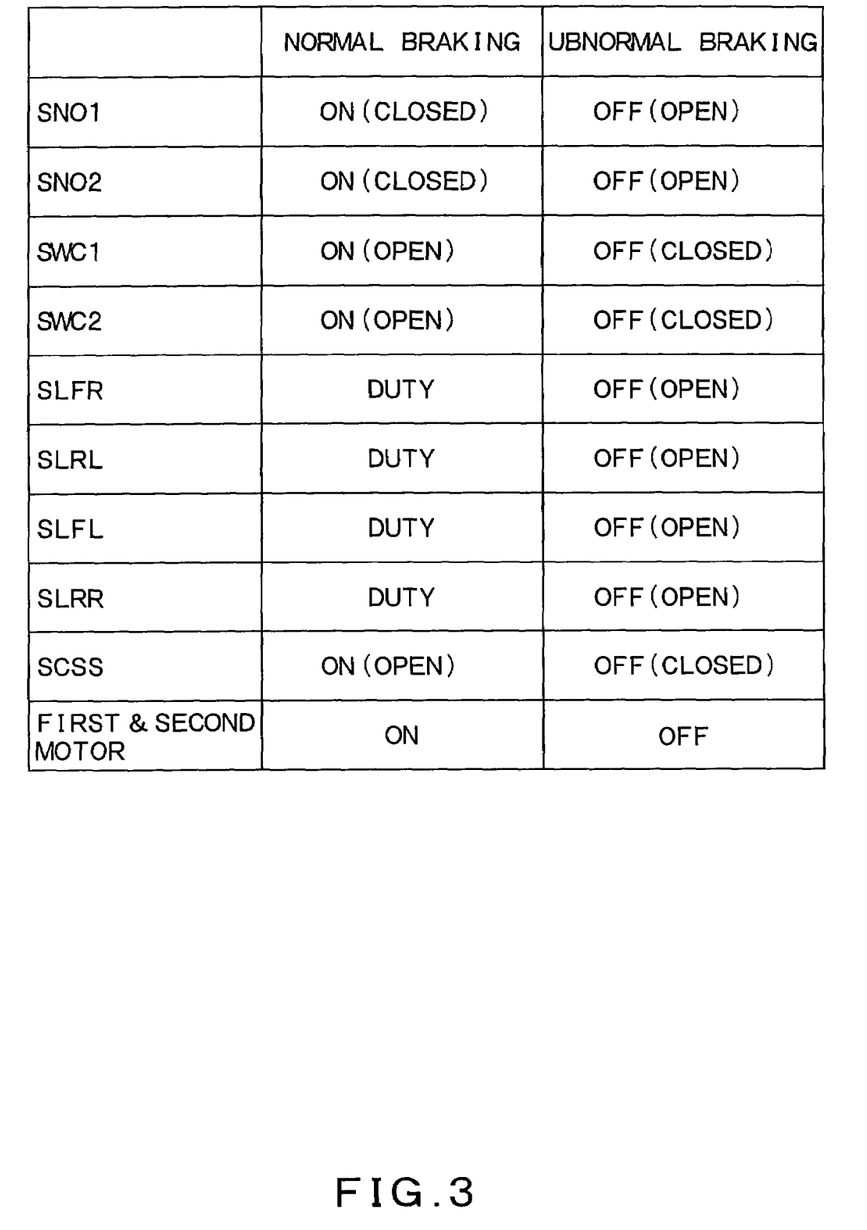
FIG. 3 is a table showing operating states of portions in the vehicle brake control device in normal braking and in an abnormal situation.

The operation of the brake control device during normal braking and in an abnormal situation will be explained below separately. FIG. 3 is a table showing the operating states of portions of the vehicle brake control device during the normal braking and in the abnormal situation. The brake ECU 100 determines, by executing a conventional initial check or the like, whether or not the abnormal situation has arose. If the abnormal situation arises, abnormal-state braking operation is executed until the abnormal situation goes away.

(1) Operation During the Normal Braking

During normal braking, when the brake pedal 1 is depressed and the detection signal from the depression force sensor 2 is inputted to the brake ECU 100, the brake ECU 100 operates the various control valves SCSS, SNO1, SNO2, SWC1, SWC2, SLFR, SLRL, SLFL, SLRR, and the first and second motors 11, 12 such that they are in the operating states shown in FIG. 3.

More specifically, electric power to both the first and second normally-open valves SNO1 and SNO2 is turned to ON, and electric power to both the first and second normally-closed valves SWC1 and SWC2 is turned to ON. Therefore, the first and second normally-open valves SNO1 and SNO2 are both put into a closed state, and the first and second normally-closed valves SWC1 and SWC2 are both put into an open state.

The ON/OFF switching of electric power to the first to fourth linear valves SLFR, SLRL, SLFL, SLRR is subject to duty control (or PWM control) under which the amount of electric power supplied per unit time to the linear valves is controlled in such a way that the pressure differences between the upstream and downstream sides of the linear valves are controlled linearly. Electric power to the stroke control valve SCSS is turned to ON, causing the stroke simulator 4 to be connected with the secondary chamber 3b through the brake conduits B and D. In this case, the brake fluid in the secondary chamber 3b moves to the stroke simulator 4 when the brake pedal is depressed and the pistons 3c and 3d move. Therefore, the brake pedal 1 can be depressed without making the driver feel that depressing the brake pedal 1 becomes like pressing a hard board (i.e. giving board feeling) as a result of the increase in the master cylinder pressure.

Electric power to both the first and second motors 11 and 12 is turned to ON and in turn the pumps 7 to 10 draw in and discharge brake fluid. The pumps 7 to 10 execute pumping operation in this manner, and thereby the brake fluid is supplied to the W/Cs 6FR to 6RR.

Since the first and second normally-open valves SNO1 and SNO2 are in a closed state at this time, the brake fluid pressures downstream of the pumps 7 to 10, that is, the W/C pressures of the W/Cs 6FR to 6RR, are increased. However, since the first and second normally-closed valves SWC1 and SWC2 are in an open state and the amounts of electric power supplied to the first to fourth linear valves SLFR, SLRL, SLFL, and SLRR are subject to the duty control, the W/C pressures of the W/Cs 6FR to 6RR are adjusted according to the duty ratios of the duty control.

The brake ECU 100 monitors the W/C pressures in the W/Cs 6FR to 6RR based on the detection signals from the pressure sensors 13 to 16. The brake ECU 100 accordingly adjusts the W/C pressures to desired values by adjusting the amounts of electric power supplied to the first and second motors 11 and 12 to control the revolution speeds thereof and by controlling the ON/OFF duty ratios for the electric power that is supplied to the first to fourth linear valves SLFR, SLRL, SLFL, and SLRR.

Thus, braking force is generated according to the depression force applied to the brake pedal 1.

(2) Abnormal-state Braking Operation

When an abnormal situation arises in the vehicle brake control device, there is a possibility that control signals cannot be outputted from the brake ECU 100, or that some of the control valves SCSS, SNO1, SNO2, SWC1, SWC2, SLFR, SLRL, SLFL, SLRR or the first and second motors 11, 12 do not work properly. In this case, electric power to the various control valves SCSS, SNO1, SNO2, SWC1, SWC2, SLFR, SLRL, SLFL, SLRR and the first and second motors 11, 12 is turned to OFF.

Since the electric power to both the first and second normally-open valves SNO1 and SNO2 is turned to OFF, both valves SNO1 and SNO2 are in the open states. Since the electric power to both the first and second normally-closed valves SWC1 and SWC2 is turned to OFF, both valves SWC1 and SWC2 are in the closed states.

Since the electric power to all of the first to fourth linear valves SLFR, SLRL, SLFL, and SLRR is turned to OFF, they are in the open states. Since electric power to the stroke control valve SCSS is also turned to OFF, the stroke simulator 4 and the secondary chamber 3b are cut off from each other.

Since the electric power to the first and second motors 11 and 12 is turned to OFF, the pumps 7 to 10 stop drawing in and discharging the brake fluid.

At this time, the primary chamber 3a of the M/C 3 is in a state in which it is connected with the W/C 6FR in the right front wheel FR via the brake conduits A, E, and G1, and the secondary chamber 3b is in a state in which it is connected with the W/C 6FL in the left front wheel FL via the brake conduits B, F, and G3.

Therefore, if the brake pedal 1 is depressed and the push rod or the like is pushed according to the applied depression force, the M/C pressure is generated in the primary chamber 3a and the secondary chamber 3b and the M/C pressure is transmitted to the W/Cs 6FR and 6FL. Braking force is thereby generated for both front wheels FR and FL.

In the abnormal-state braking operation described above, the W/C pressures in the W/Cs 6FR and 6FL on the front wheels also takes effect in the brake conduits G1 and G3. However, the check valves 20 and 21 prevent the W/C pressures from bearing on the pumps 7 and 9 and thereby prevent the brake fluid leaking through the pumps 7 and 9. The W/C pressures therefore are not decreased because of leaking of the brake fluid.

The vehicle brake control device in this embodiment operates as described above. The effects to be described below can be achieved by the vehicle brake control device.

(1) During normal braking, as described above, the vehicle brake control device generates the W/C pressures in the W/Cs 6FR to 6RR by operating the various control valves SCSS, SNO1, SNO2, SWC1, SWC2, SLFR, SLRL, SLFL, SLRR and the first and second motors 11, 12, thereby causing the pumps 7 to 10 to pressurize the W/Cs 6FR to 6RR.

When an abnormal situation occurs in the vehicle brake control device, the vehicle brake control device can generate the W/C pressures in the W/Cs 6FR and 6FL by means of the M/C pressures that are generated in the primary chamber 3*a* and the secondary chamber 3*b* by depressing of the brake pedal 1, without operating the various control valves SCSS, SNO1, SNO2, SWC1, SWC2, SLFR, SLRL, SLFL, SLRR or the first and second motors 11, 12.

In other words, the relationship between the supply of brake fluid from the M/C 3 and the input of the depression force on the brake pedal 1 is not mechanically severed. Therefore, even if some sort of abnormality occurs in the vehicle brake control device, braking force can be generated reliably without depending on the control performed by the brake ECU 100. Thus the vehicle brake control device has a structure that is effectively fail-safe. More specifically, in the vehicle brake control device, the W/C pressures are generated mechanically by the operation of the brake pedal 1 by the driver when an abnormal situation arises (i.e. when fail-safe operation is carried out.)

(2) The W/Cs 6FR and 6FL for the front wheels FR and FL are pressurized in the abnormal situation. The braking force is thus generated on the front wheels FR and FL, so braking force can be generated with maintaining a vehicle state more stable than that of a vehicle in which the braking force is generated only on the rear wheels RL and RR.

(3) During normal braking, pressurization for the W/Cs 6FR to 6RR is controlled by controlling the revolution speeds of the first and second motors 11 and 12, and pressure adjustment for the W/Cs 6FR to 6RR is achieved by the duty control of the first to fourth linear valves SLFR, SLRL, SLFL, and SLRR.

It is therefore possible to increase the accuracy of the W/C pressures generated in the W/Cs 6FR to 6RR.

(4) In the vehicle brake control device in this embodiment, the first conduit path is a combination of the W/Cs 6FR and 6RL for the right front wheel FR and the left rear wheel RL, and the second conduit path is a combination of the W/Cs 6FL and 6RR for the left front wheel FL and the right rear wheel RR. In other words, each of the conduit paths supplies at a side the brake fluid to the W/C 6FL or 6FR for the front wheel FL or FR, and supplies at another side the brake fluid to the W/C 6RL or 6RR for the rear wheel RL or RR.

Generally, the W/Cs 6FL and 6FR for the front wheels FL and FR require a larger amount of brake fluid to generate the braking force than do the W/Cs 6RL and 6RR for the rear wheels RL and RR. If each of the first and second conduit paths includes a combination of front and rear wheel cylinders, as described above, it is possible for the conduit paths to require the same amount of brake fluid in generating the braking force. It is therefore possible for both the first and second motors 11 and 12 to have the same performance, and therefore to making the first and second motors 11 and 12 have a common structure.

(5) As described above, it is important in the abnormal situation that the fail-safe operation be made possible, even if the various control valves SCSS, SNO1, SNO2, SWC1, SWC2, SLFR, SLRL, SLFL, SLRR and the first and second motors 11, 12 do not work.

To make the fail-safe operation work in the vehicle brake control device in this embodiment, the first normally-closed valves SWC1 is positioned between the brake conduit G and the brake conduits E, and the second normally-closed valves SWC2 is positioned between the brake conduit G and the brake conduits F. The master reservoir 3*f* and the other part of the M/C 3 are therefore cut off from one another in the abnormal situation. This makes it possible to prevent the brake fluid in the primary chamber 3*a* and the secondary chamber 3*b* from flowing into the master reservoir 3*f* via the brake conduit G when the brake pedal 1 is depressed, which would make it impossible to pressurize the W/Cs 6FR and 6FL.

(6) Since the first and second normally-closed valves SWC1 and SWC2 are closed in the abnormal situation, the M/C pressure is transmitted only to the front wheels FR and FL, respectively. This makes it possible to decrease the amount of brake fluid to be consumed. This in turn makes it possible to generate the same amount of braking force by using a brake pedal with a shorter stroke, or by using an M/C with a smaller diameter.

(7) In this embodiment, the various control valves SCSS, SNO1, SNO2, SWC1, SWC2, SLFR, SLRL, SLFL, SLRR and the first and second motors 11, 12 are put into a non-operating state in the abnormal situation, but it is also possible to put them into a state to be described below.

For example, if it is possible to specify a location where the abnormality has occurred, operation can be stopped only in one of the first and second conduit paths that includes the location where the abnormality has occurred, and the braking force can be generated using the other of the first and second conduit path that does not include the location where the abnormality has occurred. In other words, in the vehicle brake control device in this embodiment, since the first and second motors 11 and 12 are located in the first and second conduit paths, respectively, they can be operated separately, and the braking force can still be generated using only one of the two conduit paths. Of course, it is also possible for either one of the first and second motors 11 and 12 to be the location where the abnormality has occurred, but this effect of the vehicle brake control device can be achieved in that case as well.

Even in the case where only one of the first and second conduit paths is used and only one of the first and second motors 11, 12 is operated, the electric power to the stroke control valve SCSS can be turned to OFF, so that the stroke control valve SCSS is set to a closed state. In this occasion, the W/C pressure can still be generated in the other conduit path according to the depression of the brake pedal 1. Therefore, it is possible to provide two separate conduit paths, one that generates the W/C pressure based on the operation of one of the first and second motors 11 and 12 and another that generates the W/C pressure mechanically based on the depression of the brake pedal 1.

An accumulator type vehicle brake control device is one of conventional vehicle brake control device. The accumulator type vehicle brake control device includes an accumulator which accumulates a fixed brake fluid pressure and uses in the braking operation the accumulated brake fluid pressure to pressurize the W/Cs. If the accumulator itself fails in the accumulator type vehicle brake control device, it becomes impossible to pressurize the W/Cs in all four wheels. In contrast, in this embodiment, the W/Cs 6FR to 6RR are pressurized using the first and second motors 11 and 12, so, as described above, it is possible to avoid a situation in which none of the W/Cs 6FR to 6RR for the wheels FR to RR can be pressurized.

Second Embodiment

A second embodiment of the present invention will be explained. In this embodiment, a portion of the configuration of the vehicle brake control device is different from the configuration in the first embodiment, but the overall configuration is basically the same as that in the first embodiment, so only the parts which are different from the first embodiment will be explained.

Figure 4:
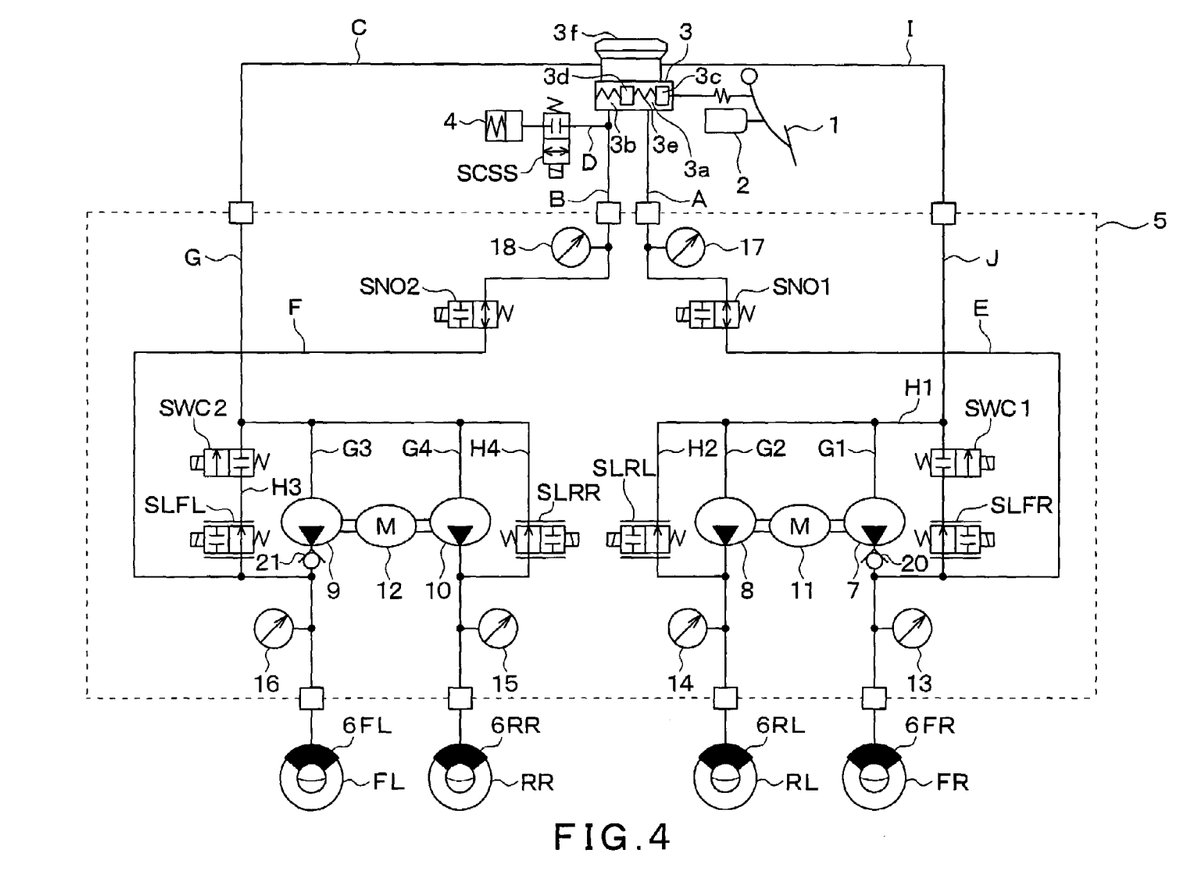
FIG. 4 is a diagram showing a hydraulic circuit configuration of a vehicle brake control device according to a second embodiment of the present invention.

FIG. 4 is a diagram showing a hydraulic circuit configuration of a vehicle brake control device according to this embodiment. As shown in FIG. 4, the vehicle brake control device in this embodiment further includes a brake conduit I and a brake conduit J. The brake conduit I, which is located outside the brake fluid pressure control actuator 5 and is connected with the master reservoir 3f, is also connected with the brake conduit J, which is located in the brake fluid pressure control actuator 5. The brake conduit J is connected with the brake conduit H1 on the downstream side of the first normally-closed valve SWC1, that is, on the intake port side of the first and second pumps 7 and 8.

Thus, at an exterior of the brake fluid pressure control actuator 5, brake conduits that are connected with the master reservoir 3f are divided into two brake conduits, that is, the brake conduit C and the brake conduit I.

The vehicle brake control device configured as described above operates in the same way as the vehicle brake control device in the first embodiment. Therefore, the same effects can be achieved as are achieved by the vehicle brake control device in the first embodiment. In addition, because the brake fluid is supplied to each of the first and the second conduit paths through the brake conduits G and I respectively, a greater amount of brake fluid can be supplied.

Third Embodiment

A third embodiment of the present invention will be explained. In this embodiment, a portion of the configuration of the vehicle brake control device is different from the configuration in the first embodiment, but the overall configuration is basically the same as that in the first embodiment, so only the parts which are different from the first embodiment will be explained.

Figure 5:
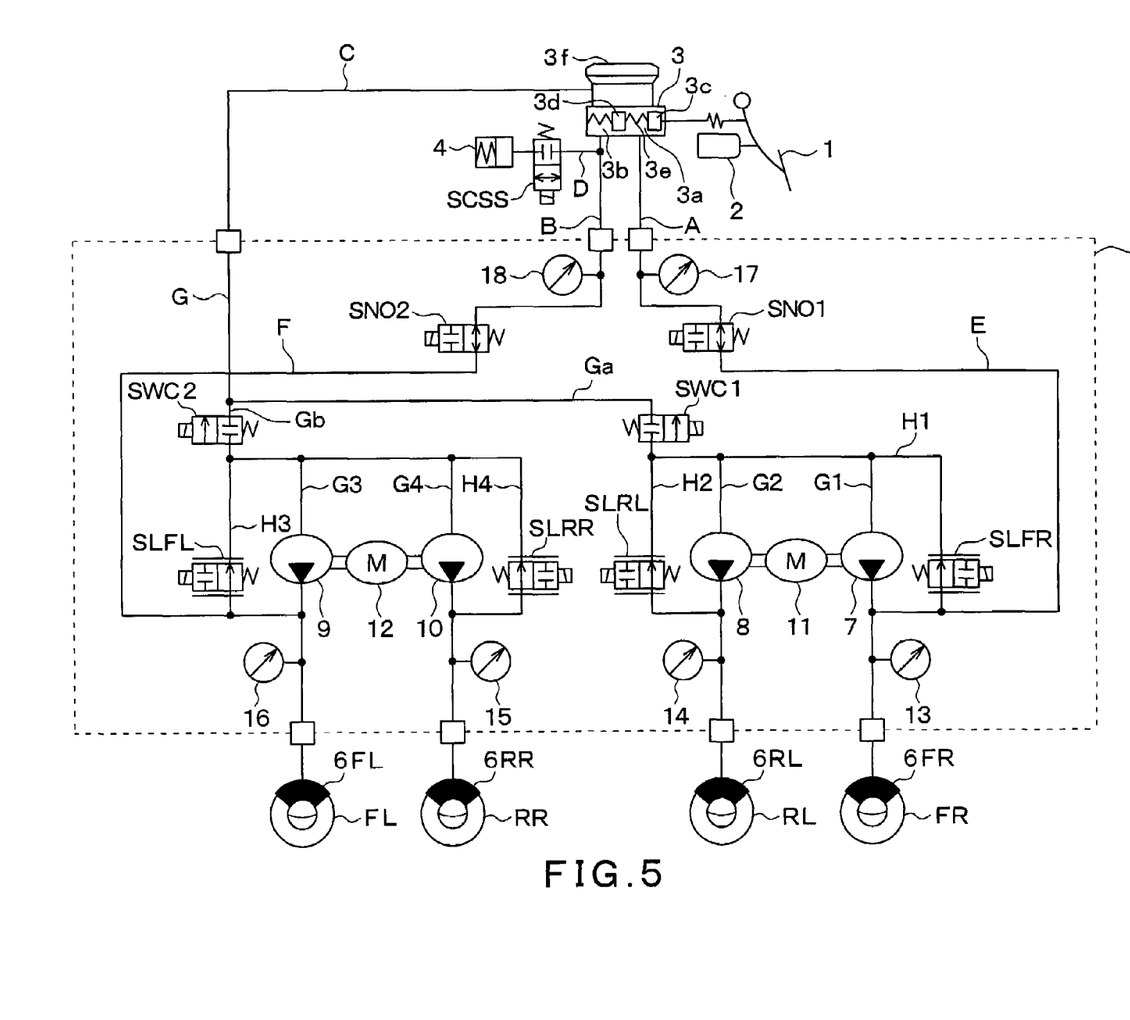
FIG. 5 is a diagram showing a hydraulic circuit configuration of a vehicle brake control device according to a third embodiment of the present invention.

FIG. 5 is a diagram showing a hydraulic circuit configuration of a vehicle brake control device according to this embodiment. As shown in FIG. 5, in the vehicle brake control device in this embodiment, the brake conduit G is divided into two brake conduits Ga and Gb. The first normally-closed valve SWC1 is located in the brake conduit Ga (that is, downstream of the dividing point of the conduits Ga and Gb and upstream of the brake conduits H1 and H2). The second normally-closed valve SWC2 is located in the brake conduit Gb (that is, downstream of the dividing point and upstream of the brake conduits H3 and H4).

In this configuration, even if the first normally-closed valve SWC1 is closed when an abnormality occurs, only the portion of the system on the upstream side of the brake conduits H1 and H2 is closed. Therefore, if the M/C pressure is generated in the primary chamber 3a of the M/C 3 because of depressing of a brake pedal 1, the M/C pressure can be transmitted not only to the W/C 6FR for the right front wheel FR, but also to the W/C 6RL for the left rear wheel RL. Likewise, even if the second normally-closed valve SWC2 is closed when an abnormality occurs, only the portion of the system on the upstream side of the brake conduits H3 and H4 is closed. Therefore, if the M/C pressure is generated in the secondary chamber 3b of the M/C 3 because of depressing of the brake pedal 1, the M/C pressure can be transmitted not only to the W/C 6FL for the left front wheel FL, but also to the W/C 6RR for the right rear wheel RR.

Thus, in the vehicle brake control device in this embodiment, it is possible to generate the W/C pressures in the W/Cs 6FR to 6RR for all four wheels FR to RR in the abnormal situation. Better balanced braking forces can therefore be generated.

In this embodiment, check valves 20 and 21, which were shown in the first and second embodiments, are not provided. However, the first and second normally-closed valves SWC1 and SWC2, which are located upstream of the pumps 7 and 9, can stop the brake fluid so that no drop occurs in the W/C pressures even if the brake fluid leaks from pumps 7 and 9.

In addition, since the first and second normally-closed valves SWC1 and SWC2 are closed, the M/C pressure is transmitted to two wheels, respectively, in other words, to both wheels in each conduit path. Therefore, instead of effects such as a smaller diameter or the like for the M/C 3 described in the first and second embodiments, it is possible in this embodiment to generate a greater ratio of the braking force to the M/C pressure.

Fourth Embodiment

A fourth embodiment of the present invention will be explained. In this embodiment, a portion of the configuration of the vehicle brake control device is different from the configuration in the third embodiment, but the overall configuration is basically the same as that in the third embodiment, so only the parts which are different from the third embodiment will be explained.

Figure 6:
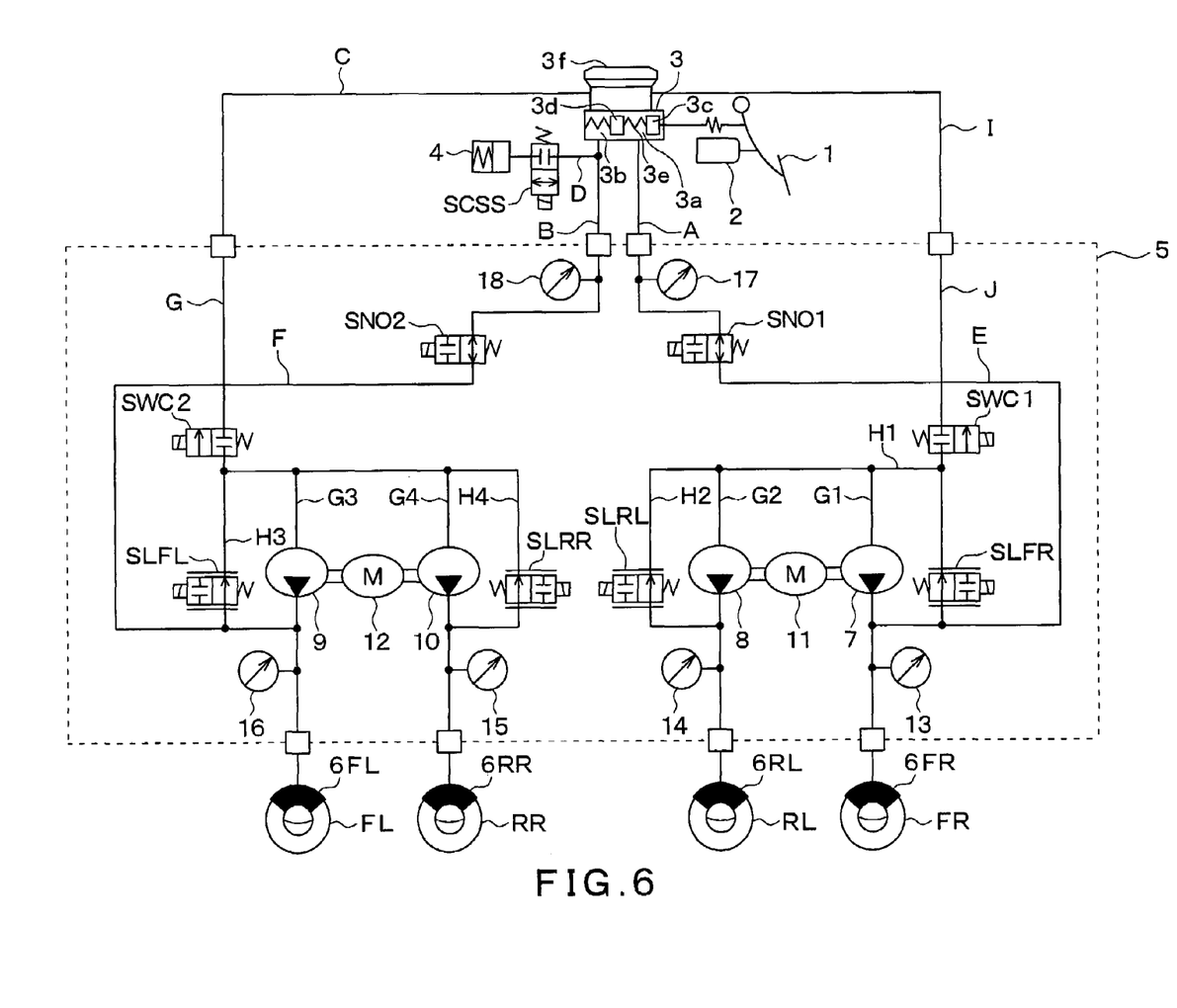
FIG. 6 is a diagram showing a hydraulic circuit configuration of a vehicle brake control device according to a fourth embodiment of the present invention.

FIG. 6 is a diagram showing a hydraulic circuit configuration of a vehicle brake control device according to this embodiment. As shown in FIG. 6, the vehicle brake control device in this embodiment includes, as in the second embodiment, the brake conduit I, which is connected with a master reservoir 3f, and the brake conduit J. The brake conduit I, which is provided outside the brake fluid pressure control actuator 5, is connected with the brake conduit J, which is provided inside the brake fluid pressure control actuator 5. The brake conduit J is connected with the brake conduit H1 on the upstream side of the first normally-closed valve SWC1, that is, on the intake port side of the first and second pumps 7 and 8.

The brake conduit I is located outside the brake fluid pressure control actuator 5. At an exterior of the brake fluid pressure control actuator 5, brake conduits that are connected with the master reservoir 3f are divided into two brake conduits, that is, a brake conduit C and the brake conduit I.

The vehicle brake control device configured as described above operates in the same way as the vehicle brake control device in the first embodiment. Therefore, the same effects can be achieved as are achieved by the vehicle brake control device in the first embodiment. In addition, since the brake fluid is supplied in the conduit paths through the brake conduits C and I respectively, a greater amount of the brake fluid can be supplied.

In this embodiment, since the first and second normally-closed valves SWC1 and SWC2 are closed in the abnormal situation, the M/C pressure is transmitted to two wheels, respectively, in other words, to both wheels in each conduit path. Therefore, it is possible to generate a greater ratio of the braking force to the M/C pressure.

Fifth Embodiment

A fifth embodiment of the present invention will be explained. In this embodiment, a portion of the configuration of the vehicle brake control device is different from the configuration in the third embodiment, but the overall configuration is basically the same as that in the third embodiment, so only the parts which are different from the third embodiment will be explained.

Figure 7:
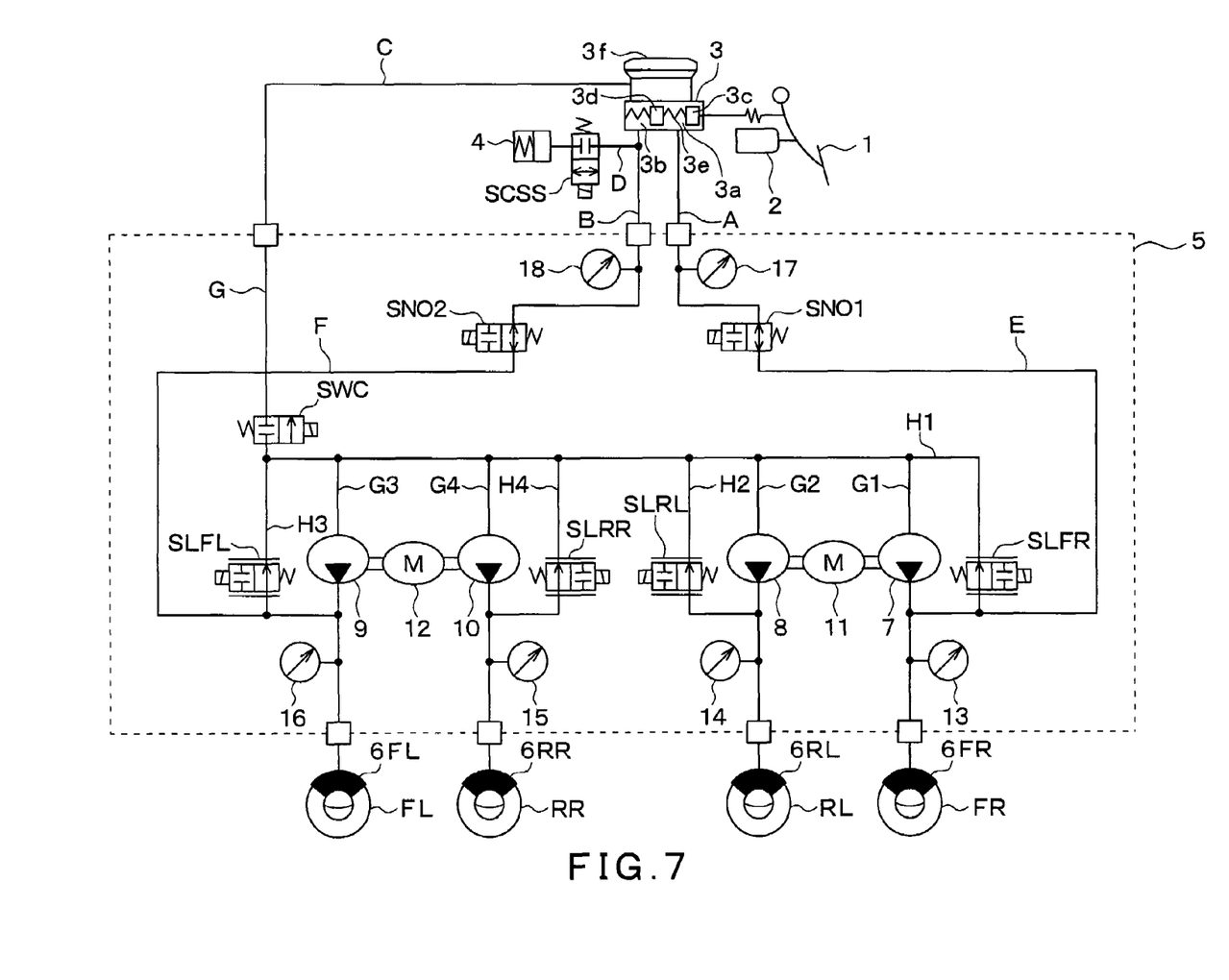
FIG. 7 is a diagram showing a hydraulic circuit configuration of a vehicle brake control device according to a fifth embodiment of the present invention.

FIG. 7 is a diagram showing a hydraulic circuit configuration of a vehicle brake control device according to this embodiment. As shown in FIG. 7, in the vehicle brake control device in this embodiment, the two conduit paths share a single normally-closed valve SWC, instead of the first and second normally-closed valves SWC1 and SWC2 provided in the third embodiment.

Even in this configuration, during the normal braking, W/C pressures in the W/Cs 6FR to 6RR for the four wheels FR to RR can be adjusted appropriately, and when an abnormality occurs, the M/C pressure that is generated in the M/C 3 according to depressing of a brake pedal 1 can be transmitted to the W/Cs 6FR to 6RR for the four wheels FR to RR.

In addition, the single normally-closed valve SWC is closed in the abnormal situation. The M/C pressure is accordingly transmitted to all wheels FR to RR in the two conduit paths. Therefore, it is possible to make the system configuration more compact.

In the vehicle brake control device in this embodiment, the way for driving the normally-closed valve SWC is the same as that for driving the first and second normally-closed valves SWC1 and SWC2 in the vehicle brake control device according to the first embodiment, as shown in FIG. 3.

Other Embodiments

The vehicle brake control device as described in each of the embodiments above is not limited by the embodiments above, but may be modified in a variety of ways.

For example, in the first to fifth embodiments, examples were explained of vehicle brake control devices applied to a vehicle in which conduit paths include hydraulic circuits in an X conduit arrangement, with a conduit path connecting the left front and right rear wheels and another conduit path connecting the right front and left rear wheels. However, the present invention may also be applied to other systems, such as a front-and-rear conduit arrangement or the like.

Although the stroke simulator 4 is provided being connected with the brake conduit B that is in turn connected with the secondary chamber 3b of the M/C 3, the stroke simulator 4 may also be provided being connected with the brake conduit A that is in turn connected with the primary chamber 3a.

Figure 8:
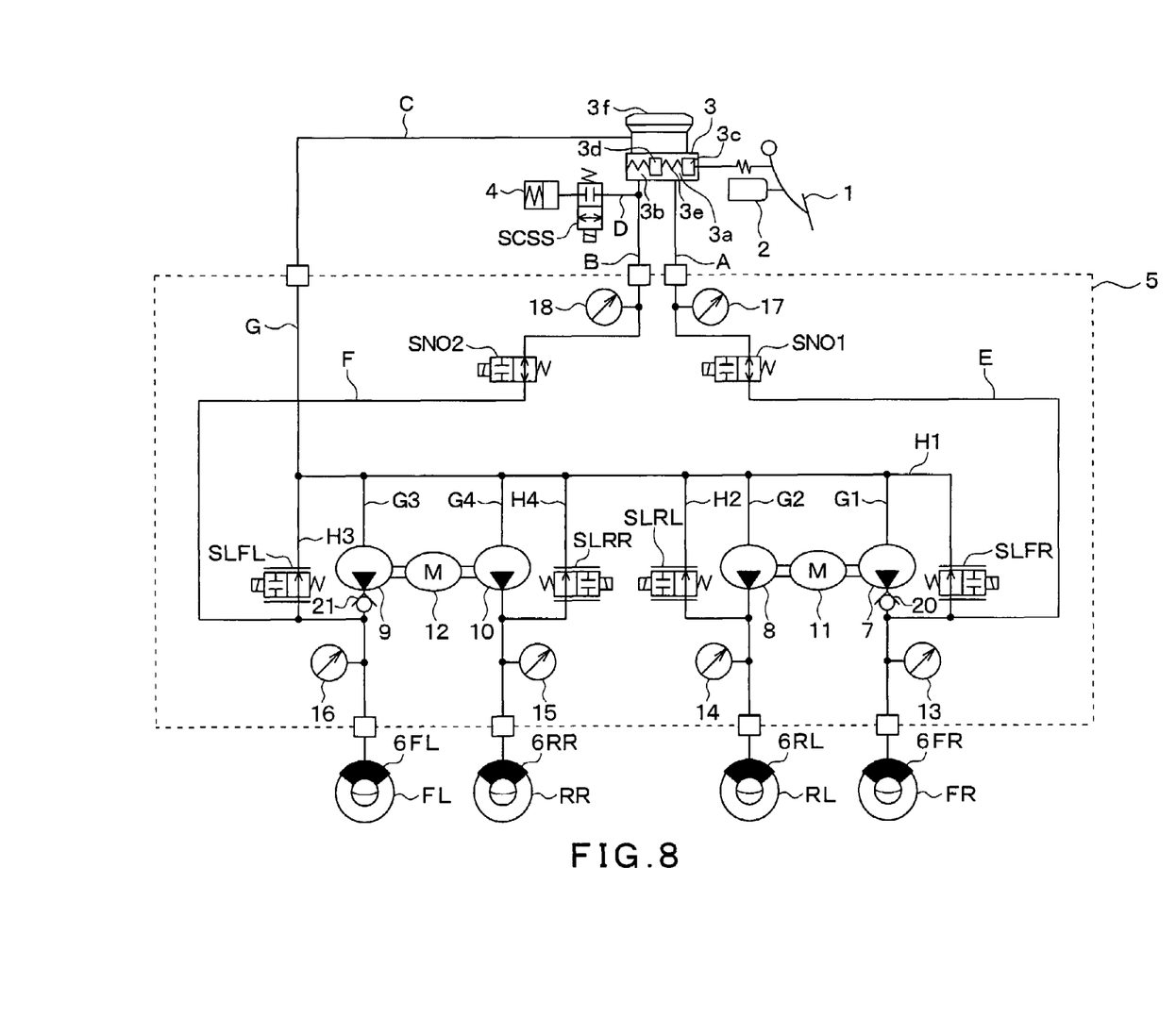
FIG. 8 is a diagram showing a hydraulic circuit configuration of a vehicle brake control device according to another embodiment of the present invention.

Also, in the preceding embodiments, even if the first to fourth linear valves SLFR to SLRR do not operate, the M/C pressure that is generated mechanically based on depressing of the brake pedal 1 is transmitted to the W/Cs 6FL, 6FR and the like in consideration of the need for fail-safe operation. However, if a location where an abnormality occurs is somewhere other than the first to fourth linear valves SLFR to SLRR, the first to fourth linear valves SLFR to SLRR can operate. So if electric power can be supplied to the first to fourth linear valves SLFR to SLRR so that the brake conduits H1 to H4 are closed, it would be possible to transmit the M/C pressure to the W/Cs 6FL, 6FR and the like in the same manner as described above. Therefore, it is not necessarily the case that the first and second normally-closed valves SWC1, SWC2 or the single normally-closed valve SWC must be provided. As shown in the hydraulic circuit configuration shown in FIG. 8, a structure may also be used that is not provided with the first and second normally-closed valves SWC1, SWC2 or with the single normally-closed valve SWC.

However, in the sense that all fail-safe operations must be able to be executed mechanically, the first and second normally-closed valves SWC1 and SWC2 and the single normally-closed valve SWC are important.

Figure 9:
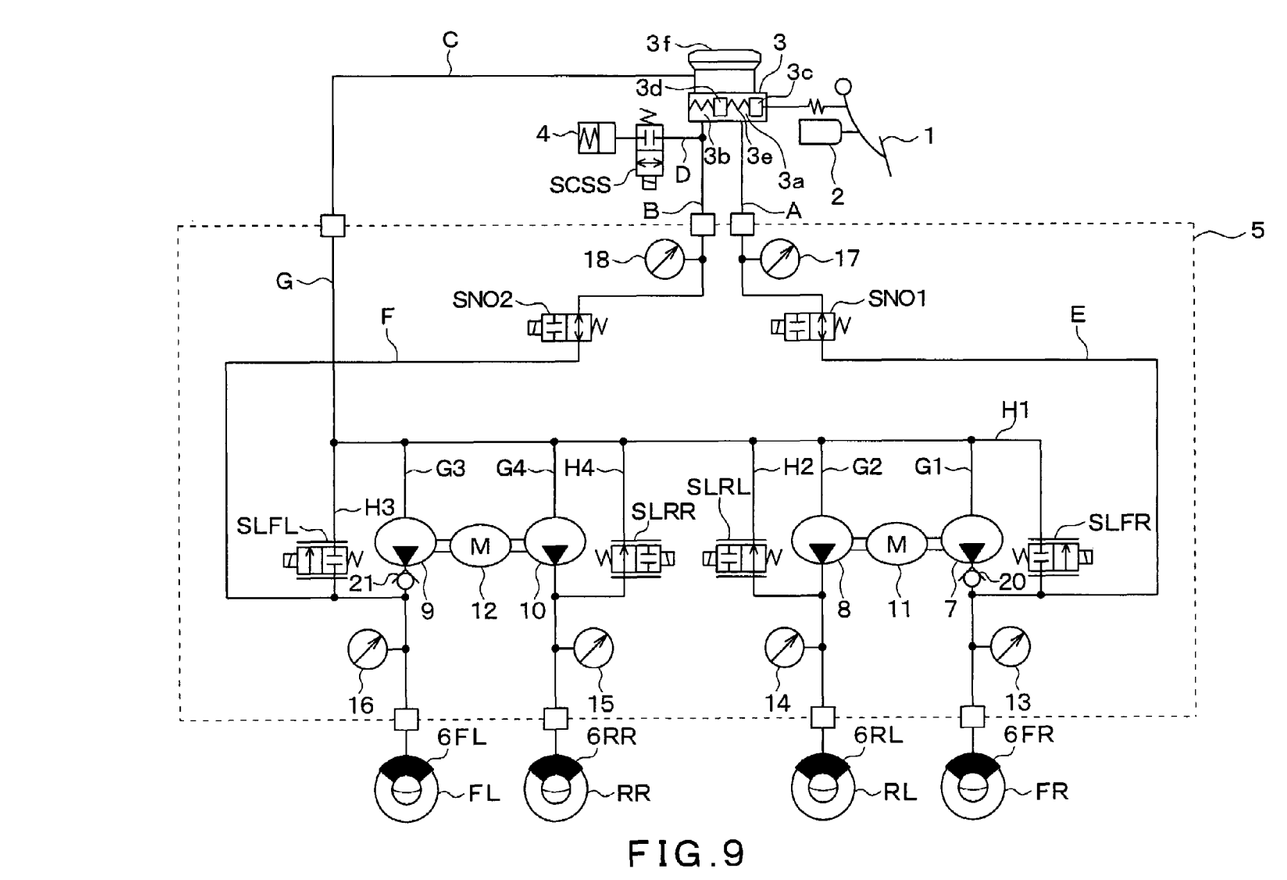
FIG. 9 is a diagram showing a hydraulic circuit configuration of a vehicle brake control device according to another embodiment of the present invention.

Therefore, as shown in the hydraulic circuit configuration shown in FIG. 9, it is more preferable if the first linear valve SLFR and the third linear valve SLFL are configured as normally-closed linear valves, because the fail-safe operation can be executed mechanically. Of course, the second linear valve SLRL and the fourth linear valve SLRR may also be configured as normally-closed linear valves.

Although the first and second normally-closed valves SWC1 and SWC2 are normally-closed valves in the embodiments described above, they may also be configured as normally-open control valves. Although the first and second normally-open valves SNO1 and SNO2 are normally-open valves in the above embodiment, but they may also be provided as normally closed control valves.

What is claimed is:

1. A vehicle brake control device, comprising:
  a brake operating member to be operated by a driver;
  an operation amount sensor for detecting an operation amount of the brake operating member;
  a cylinder including a first piston, a second piston, and a reservoir, the first and second pistons demarcating a first chamber and a second chamber, the reservoir storing brake fluid and being in communication with the first chamber and the second chamber, wherein the first and second pistons are pushed by a push rod connected with the brake operating member and accordingly compress the first and second chambers;
  first and second front wheel cylinders, which are respectively installed to two front wheels;
  first and second rear wheel cylinders, which are respectively installed to two rear wheels;
  a main conduit for connecting the first and second front wheel cylinders and the first and second rear wheel cylinders with the reservoir, the main conduit branching into four sections which are respectively be connected with the first and second front wheel cylinders and the first and second rear wheel cylinders;
  a first pump located in a first one of the four sections, the first pump for pressurizing the first front wheel cylinder by drawing in and discharging the brake fluid stored in the reservoir;
  a second pump located in a second one of the four sections, the second pump for pressurizing the first rear wheel cylinder by drawing in and discharging the brake fluid stored in the reservoir;
  a third pump located in a third one of the four sections, the third pump for pressurizing the second front wheel cylinder by drawing in and discharging the brake fluid stored in the reservoir;

a fourth pump located in a fourth one of the four sections, the fourth pump for pressurizing the second rear wheel cylinder by drawing in and discharging the brake fluid stored in the reservoir;

a first motor for driving the first and second pumps which pressurize a first conduit path in the main conduit;

a second motor for driving the third and fourth pumps which pressurize a second conduit path in the main conduit;

first to fourth adjustment conduits, which are located respectively in parallel with the four pumps;

first to fourth linear valves, which are respectively located in the first to fourth adjustment conduits;

a first auxiliary conduit for connecting the first chamber with the first front wheel cylinder via a point downstream of the first pump;

a first control valve located in the first auxiliary conduit;

a second auxiliary conduit for connecting the second chamber with the second front wheel cylinder via a point downstream of the third pump;

a second control valve located in the second auxiliary conduit; and a control means for controlling the first to fourth linear valves, the first and second control valves, and the first and second motors, based on a detection signal from the operation amount sensor.

2. The vehicle brake control device according to claim 1, further comprising:

a third control valve, located in the first adjustment conduit, for controlling connection and disconnection between the first linear valve and the reservoir; and a fourth control valve, located in the third adjustment conduit, for controlling connection and disconnection between the third linear valve and the reservoir, wherein the control means controls the third and fourth control valves.

3. The vehicle brake control device according to claim 2, wherein the third and fourth control valves are normally-closed valves.

4. The vehicle brake control device according to claim 2, further comprising:

first and second check valves, which are provided in the discharge ports of the first pump and the third pump, respectively, wherein, the first check valve prohibits brake fluid that goes through the first auxiliary conduit to the first front wheel cylinder from flowing to the first pump; and the second check valve prohibits brake fluid that goes through the second auxiliary conduit to the second front wheel cylinder from flowing to the third pump.

5. The vehicle brake control device according to claim 1, wherein the main conduit includes only a single portion as a portion extending from the reservoir, the single portion connected with the four sections.

6. The vehicle brake control device according to claim 1, wherein, the main conduit includes two conduit portions which extend from the reservoir and supplies with the stored brake fluid respectively through the first and second conduit paths;

one of the two conduit portions is connected with the first one and second one of the four sections; and the other of the two conduit portions is connected with the third one and the fourth one of the four sections.

7. The vehicle brake control device according to claim 1, further comprising:

a third control valve; and a fourth control valve, wherein the main conduit includes only a single portion as a portion extending from the reservoir, the single portion is connected with two branch conduits for supplying brake fluid respectively to the first and second conduit paths;

a first one of the two branch conduits is connected with the first and second ones of the four sections;

a second one of the two branch conduits is connected with the third and fourth ones of the four sections;

the third control valve is located in the first one of the two branch conduits upstream of a branching point of the first and second ones of the four sections and controls opening and closing of the first one of the branch conduits;

the fourth control valve is located in the second one of the two branch conduits upstream of a branching point of the third and fourth ones of the four sections and controls opening and closing of the second one of the branch conduit; and the control means controls the third and fourth control valves.

8. The vehicle brake control device according to claim 1, further comprising:

a third control valve; and a fourth control valve, wherein the main conduit includes two conduit portions which extend from the reservoir and supplies with the stored brake fluid respectively through the first and second conduit paths;

a first one of the two conduit portions is connected with the first one and second one of the four sections;

a second one of the two conduit portions is connected with the third one and the fourth one of the four sections;

the third control valve is located in the first one of the two conduit portions upstream of a branching point of the first and second ones of the four sections and controls opening and closing of the first one of the two conduit portions;

the fourth control valve is located in the second one of the two conduit portions upstream of a branching point of the third and fourth ones of the four sections and controls opening and closing of the second one of the two conduit portions; and the control means controls the third and fourth control valves.

9. The vehicle brake control device according to claim 1, wherein the first linear valve and the third linear valve are normally-closed linear valves.

10. The vehicle brake control device according to claim 1, further comprising:

a normally-closed valve, wherein the main conduit includes only a single portion as a portion extending from the reservoir, the single portion branching into the four sections, the normally-closed valve is located in the single portion upstream of a branching point of the four sections and controls opening and closing of the single portion; and the control means controls the normally-closed valve.

11. The vehicle brake control device according to claim 1, further comprising:

a stroke simulator; and a stroke control valve, wherein the stroke simulator accommodates brake fluid from within the cylinder when the brake operating member is operated;

the stroke control valve controls opening and closing of a communication between the stroke simulator and the cylinder; and the control means controls the stroke control valve.

12. The vehicle brake control device according to claim 1, wherein the first and second control valves are normally-open valves.

* * * * *